United States Patent [19]

Hildebrandt et al.

[11] 4,262,225

[45] Apr. 14, 1981

[54] LOW FORCE STARTING SWITCH FOR TWO-SPEED MOTOR

[75] Inventors: Eugene F. Hildebrandt, Ferguson; William D. Crow, Maryland Heights, both of Mo.

[73] Assignee: Emerson Electric Co., St. Louis, Mo.

[21] Appl. No.: 56,810

[22] Filed: Jul. 12, 1979

[51] Int. Cl.³ .......................................... H02K 11/00
[52] U.S. Cl. ................................. 310/68 E; 318/793
[58] Field of Search ..................... 310/66, 67 R, 68 R, 310/68 B, 68 E; 318/793

[56] References Cited

U.S. PATENT DOCUMENTS

| | | | |
|---|---|---|---|
| 3,018,649 | 1/1962 | Barbulesco et al. | 318/793 X |
| 3,020,465 | 2/1962 | Rowe | 310/68 E |
| 3,381,197 | 4/1968 | Waters et al. | 318/793 |
| 3,691,415 | 9/1972 | Hancock et al. | 310/68 E |
| 3,790,730 | 2/1974 | Wyland et al. | 310/68 E X |

*Primary Examiner*—Mark O. Budd
*Attorney, Agent, or Firm*—Polster, Polster and Lucchesi

[57] ABSTRACT

A motor starting switch particularly intended for use with a two speed electric motor actuable by a centrifugal actuator upon start up of the motor so as to energize the high speed and auxiliary windings of the motor for start up of the motor and for deenergizing the auxiliary winding and energizing the selected high or low speed winding of the motor after the motor has accelerated to a predetermined operating speed. The switch has a resilient, current carrying, force transmitting member interconnecting the plunger of the switch operated by the centrifugal actuator and a switch arm for energization of the auxiliary winding and for effecting movement of the switch arm within the switch.

5 Claims, 8 Drawing Figures

PRESENT INVENTION - RUN POSITION.

PRIOR ART - STARTING POSITION.

PRESENT INVENTION - RUN POSITION.

PRESENT INVENTION - START POSITION.

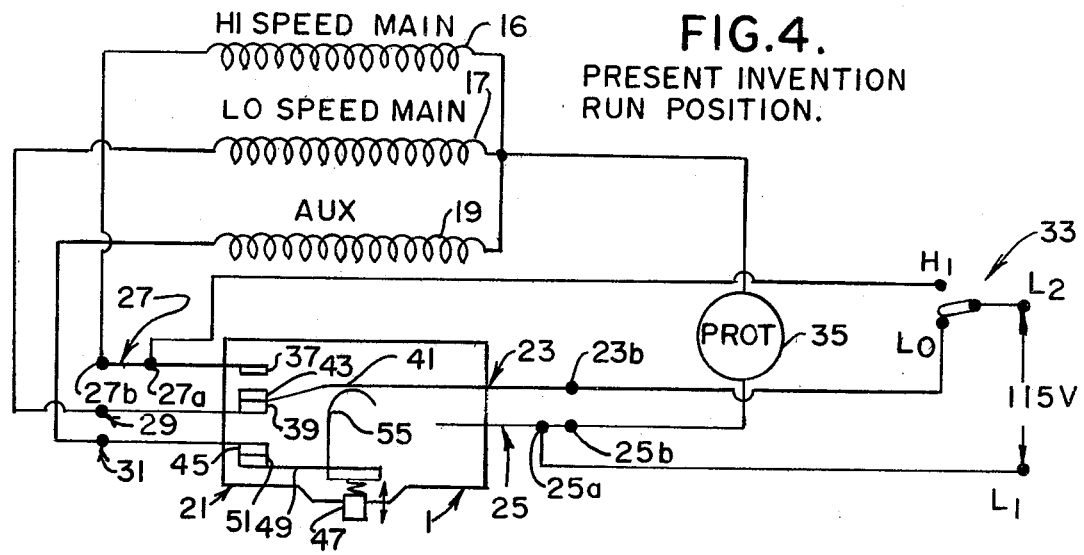
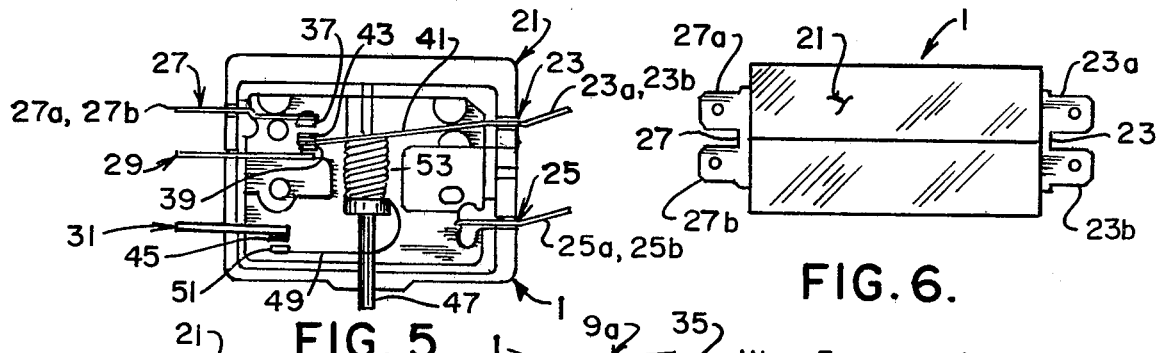
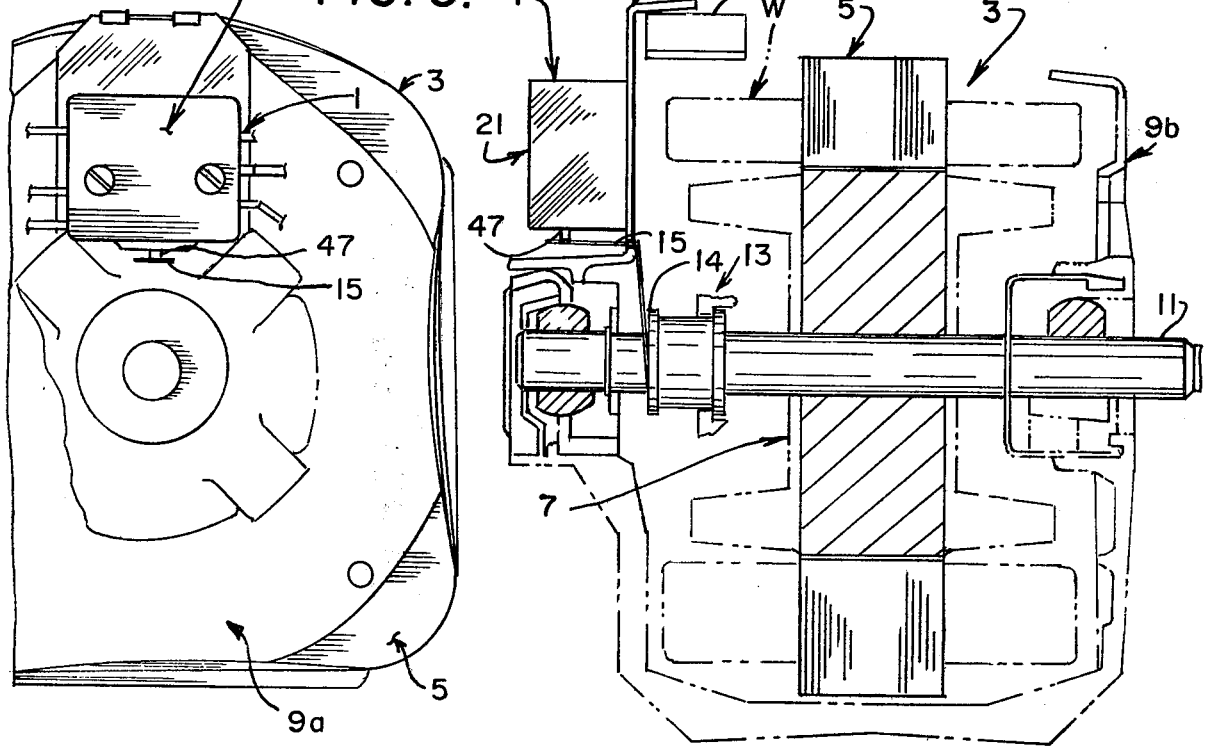

LOW FORCE STARTING SWITCH FOR TWO-SPEED MOTOR

BACKGROUND OF THE INVENTION

This invention relates to a motor starting switch and more particularly to a motor starting switch which is intended for use with a two speed electric motor.

In the operation of two speed electric motors, it is common for the motors to have three sets of windings incorporated in their stator assemblies: a high speed winding having, for example, four poles; a low speed winding having, for example, six poles; and a starting or auxiliary winding. In many motor applications it is desirable that the motor always be started in such a manner as to generate the greatest possible starting torque. Generally, the motor will generate the greatest starting torgue when it is started in its highest speed mode of operation (e.g., when the four pole windings of the above-described motor are energized). However, with certain prior art motor starting switches, timing of the movement of the contacts is required as the switch moves from its starting to its run position so as to prevent line current from being broken. The breaking of the line current to the motor oftentimes results in arcing across the switch contacts thus causing a decrease in the service or operating life of the motor starting switch with a consequent decrease in the service life of the motor. It is also difficult to ensure that the required timing of the motor starting switch can be maintained over the service life of the motor.

Also, in certain prior art two speed motor starting switches, jumpers were used within the switch so as to energize the starting or auxiliary winding when the starting switch was in its starting position. These jumpers added to the complexity and the expense of the starting switch.

In other prior art motor starting switches, excessive force could be applied to one or more of the movable switch arms as the switch was moved from its run to its starting position. This in turn caused excessive bending stresses to be applied to the switch arm which, on occasion, led to the premature failure of the switch arm upon repeated usage. Also, in certain prior art two speed motor starting switches a high force level was required for actuation of the switch. In certain instances, the force required to actuate the switch was nearly equal to the force the centrifugal actuator could apply to the starting switch. If certain of these prior art motor starting switches were not accurately positioned relative to the centrifugal actuator, the actuator would not properly open and close the switch and could cause failure of the motor in which the switch is installed.

Reference may be made to U.S. Pat. No. 3,381,197 which discloses a motor starting switch in the same general field as the starting switch as the present invention.

Among the several objects and features of this invention may be noted the provision of a motor starting switch, such as above-described, which eliminates the requirement for an internal jumper within the switch for providing energization of the starting or auxiliary winding of the motor;

the provision of such a switch which eliminates the requirement of timing the transfer of line current from the high to the low speed winding contacts of the switch (when the motor is selectively set in its low speed mode) upon movement of the switch from its starting to its run position and which effectively reduces arc energy disappated in one set of contacts within the switch thereby to increase the service life of the switch;

the provision of such a switch which limits the force exerted on the contacts within the switch when it is in its starting position thereby to prevent overstressing of the components in the switch and to prevent premature failure of the switch; and, in general, the provision of a starting switch which has a greatly enhanced service life.

SUMMARY OF THE INVENTION

Briefly, a motor starting switch of this invention is intended for use with a two speed electric motor having a first set of windings energizable for low speed operation, a second set of windings energizable for high speed operation, a starting winding energizable during start up of the motor, and a speed selector switch for selecting either high or low speed operation of the motor. The starting switch is operated by a centrifugal actuator included within the motor which is responsive to the speed of the motor for switching the starting switch between a starting position in which the high speed winding and the starting winding of the motor are energized and a run position in which the starting winding is deenergized and in which either the high or low speed winding is energized as may have been previously selected by setting of the speed selector switch. The starting switch of this invention comprises a housing, and a plurality of power input terminals adapted to be connected to a source of electrical power. The first of the above-noted power input terminals is adapted to be energized by the speed selector switch when the latter is in its low speed position. Another of the input terminals is adapted to be energized by the speed selector switch when the latter is in its high speed position. Still another of the power input terminals is adapted to be connected to the windings and to the source of electrical power. The switch further has a plurality of output terminals: a first of which is adapted to be connected to the high speed winding of the motor; a second of which is adapted to be connected to the low speed winding of the motor; and a third of which is adapted to be connected to the starting winding of the motor. The first and second output terminals each have a respective contact disposed within the housing and spaced apart from one another. A first movable switch arm is provided within the housing and is connected to the first input terminal, these first and second contacts and the first switch arm constituting a single throw double pole switch. The switch further includes a plunger movable along a path within the housing in response to the centrifugal actuator moving between its starting and run positions. The third output terminal of the switch has a third contact disposed within the housing. A second switch arm is carried by the plunger. Means is provided which is carried by the plunger for making electrical contact with the first switch arm, for conducting electrical current from the first switch arm to the second switch arm, and for effecting movement of the first switch arm with the plunger as the latter moves between its starting and run positions in response to movement of the centrifugal actuator. The first switch arm is engageable with the first contact and the second switch arm is engageable with the third contact when the plunger is in its starting position thereby to provide energization of the high speed winding regardless of the speed selected by the speed selector switch and to provide energization of the starting winding via the first switch arm and the means carried by the plunger. The first switch arm is movable from engagement with the first contact to engagement with the second contact and the second switch arm is movable clear of the third contact upon movement of the plunger from its starting to its run position thereby to deenergize the starting winding and to permit energization of the selected high or low speed windings of the motor for continued operation of the motor in its selected speed mode.

Other objects and features of this invention will be in part apparent and in part pointed out hereinafter.

BRIEF DESCRIPTION OF THE DRAWINGS

FIG. 4 is a view similar to FIG. 2 illustrating another embodiment of the motor starting switch of the present invention;

FIG. 5 is a side elevational view of the motor starting switch of the present invention, as it is shown in FIG. 2, in its run position with its side cover removed;

FIG. 6 is a plan view of the switch shown in FIG. 5;

FIG. 7 is an end view of an electric motor having a motor starting switch of the present invention installed thereon; and FIG. 8 is a vertical longitudinal cross sectional view of the motor.

Corresponding reference characters indicate corresponding parts throughout the several views of the drawings.

DESCRIPTION OF PREFERRED EMBODIMENTS

Figure 1:
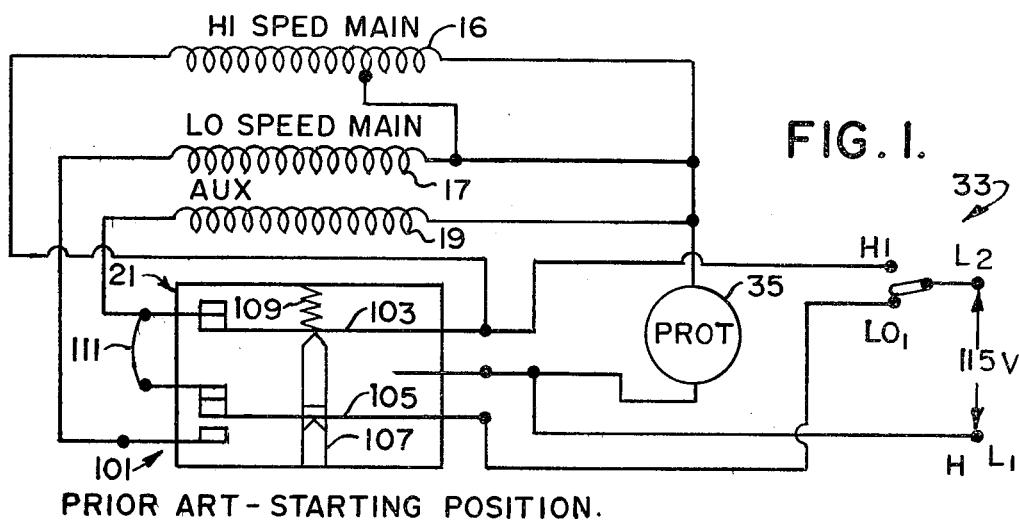
FIG. 1 is a diagrammatic view of a prior art motor starting switch connected to a two-speed electric motor.

Referring now to the drawings, and in particular to FIGS. 2-8, a motor starting switch of this invention is indicated in its entirety at reference character 1 and is shown, in FIGS. 7 and 8, to be mounted on a two speed electric motor 3. The latter is a conventional fractional horsepower, alternating current motor having a stator assembly 5, a rotor assembly 7, and a pair of end shields 9a and 9b which rotatably support the rotor assembly within the stator assembly. The rotor assembly further includes a shaft 11 extending outwardly from a rotor body. A centrifugal actuator, as generally indicated at 13 in FIG. 8, is carried on and is rotatable with shaft 11. As is typical, the centrifugal actuator assembly may include levers (not shown) responsive to centrifugal force which are biased inwardly by resilient springs (also not shown) and which, upon rotation of the rotor assembly, are forced outwardly against the bias of the springs. As the levers move outwardly, they effect movement of a sleeve 14 movable axially along shaft 11. A linkage 15 carried by the end shield interconnects sleeve 14 and an actuator plunger of motor starting switch 1 (as will be hereinafter described) for actuation of the switch upon movement of the centrifugal actuator between a start position when the motor is stopped (or is operated below a predetermined rotational speed) and a run position. For example, centrifugal actuator 13 may shift from its start to its run speed upon acceleration of the motor upon startup to an operational speed of about 80% of its synchronous speed.

Further, motor 3 includes in its stator assembly a plurality of stator windings as generally indicated at W and more particularly including a high speed winding 16 (see FIGS. 2-4) having, for example, four poles, a low speed winding 17 having six poles, and a four pole auxiliary winding 19. As is conventional, auxiliary winding 19 is energized only during startup of the motor so as to generate a rotating magnetic field of sufficient strength as to cause the motor to develop a sufficient starting torque. Upon the motor accelerating to its above-noted predetermined starting speed, centrifugal actuator 13 shifts from its start to its run position thereby to deenergize the auxiliary winding. Upon stopping of the motor, centrifugal actuator 13 shifts from its run to its start position and thus in turn shifts the starting switch from its run to its start position thereby to enable energization of the auxiliary winding upon reenergization of the motor upon start up.

As heretofore mentioned, it is conventional to effect energization of a two speed electric motor in its high speed mode of operation (i.e., with its high speed windings 16 energized) so as to provide the maximum starting torque for the motor. After the motor has been started, energization of the low speed stator windings 17 may be effected thereby to permit operation of the motor in its slow speed mode. The starting switch 1 of the present invention, as shown in FIGS. 2-6, offers an improvement over prior art starting switches, such as shown in FIG. 1.

Figure 2:
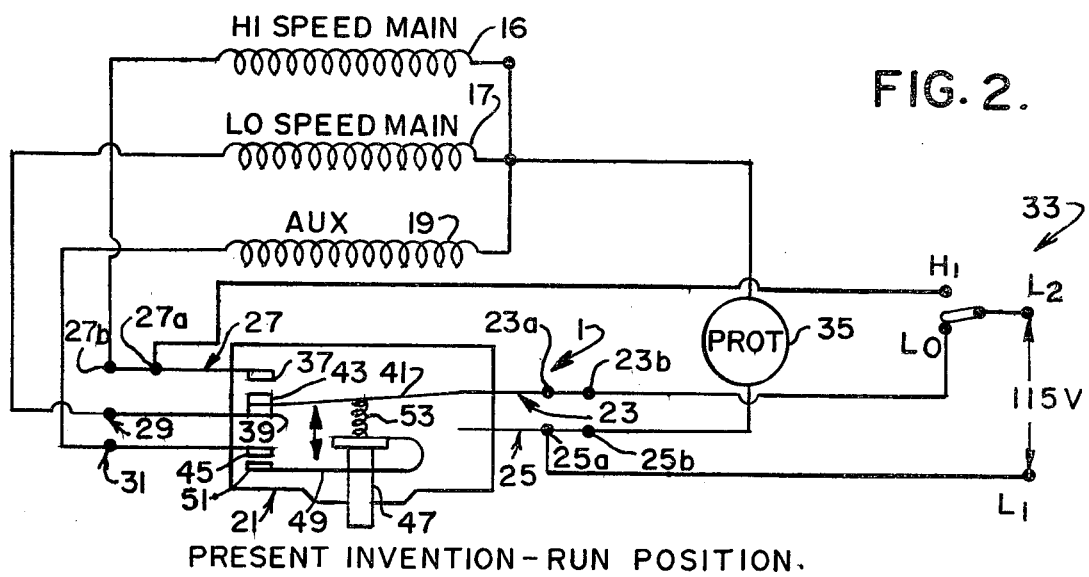
FIG. 2 is a diagrammatic view of a two speed electric motor and a motor starting switch of the present invention in its run position and set for low speed operation.
Figure 3:
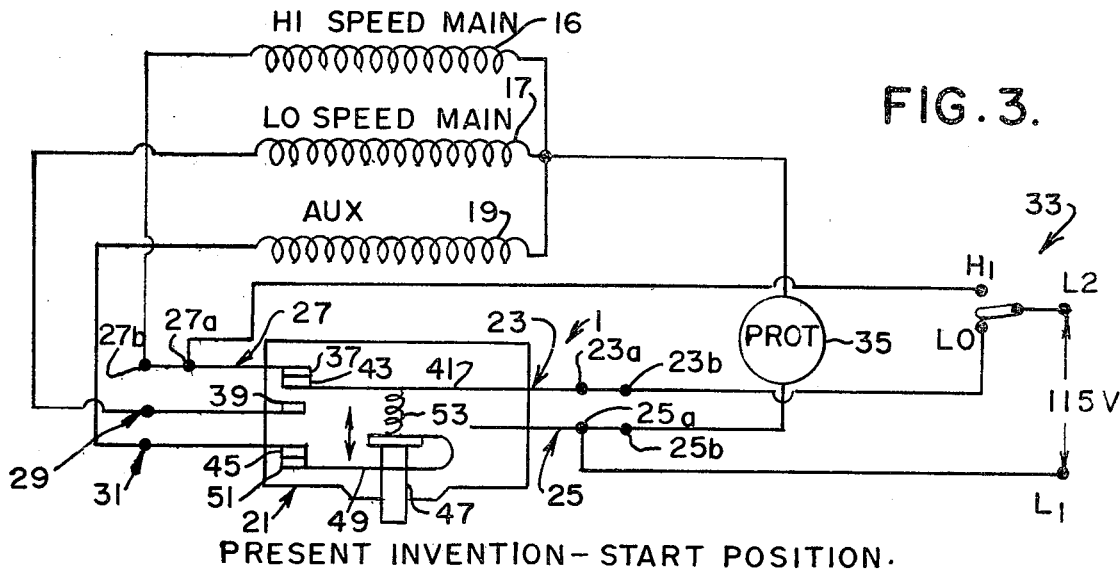
FIG. 3 is another view of the motor starting switch shown in FIG. 2 in its start position.

Referring now particularly to FIGS. 5 and 6, starting switch 1 of the present invention is shown to comprise a housing 21 of suitable synthetic resin material which is preferably a good electrical insulator, such as Bakelite or the like. Switch 1 has a plurality of electrical terminals protruding therefrom for connection of the switch to a source of suitable electric power and to windings W of motor 3. As shown in FIG. 6, five pairs of terminals in side-by-side relation may be provided on the switch for connection of two wires or leads at the same location on the switch. These pairs of switch terminals are generally indicated at 23, 25, 27, 29 and 31 and the above-reference characters designated "a" and "b" indicating common side-by-side lead connections on a corresponding pair of terminals. Switch 1 is supplied with power by a pair of power input lines (or load lines) L1 and L2, as shown in FIGS. 2-4. As noted above, motor 3 is a two speed motor. The operational speed of the motor is selected by a so-called speed selector switch 33 which is provided in one of the power input leads, for example in lead L2. Certain of these terminals constitute power input terminals and certain of the other terminals can constitute power output terminals. It will be appreciated that the "a" and "b" connections of common terminals constitute both power input and power output terminals of the switch depending on how they are connected.

Still referring to FIGS. 2-4, the low speed side of speed selector switch 33 is shown to be connected to a lead terminal 23b of terminal 23 of switch 1 and thus this last-mentioned terminal constitutes a first power input terminal. The high speed side of speed selector switch 33 is connected to lead terminal 27a of terminal 27 and thus this last-mentioned terminal constitutes a second power input terminal. Power lead L1 is shown to be connected to terminal lead 25a and terminal lead 25b is shown to be connected to one side of each of the stator windings 16, 17 and 19. As is conventional, an overload protector 35 is connected between the windings and lead terminal 25b for protecting the windings from excessive current draw with possible consequent damage to the windings. Terminal lead 27b is connected to the other end of high speed winding 16 and thus is referred to as a first power output terminal of the switch. As can be seen, terminal lead 27a, which is common to terminal lead 27b, is connected to the high speed side of speed selector switch 33. Terminal 29, constituting a second output terminal, is connected to the low speed main winding 17 of the stator assembly, and terminal 31, constituting a third power output terminal, is connected to a starting or auxiliary winding 19. Terminal lead 25b heretofore described constitutes a fourth power output terminal.

Terminals 27 and 29 each have a respective contact 37 and 39 thereon disposed within housing 21 and spaced apart from one another. Switch 1 further includes a first movable switch arm 41 disposed within the housing. Switch arm 41 is connected to terminal 23 and carries a double faced contact 43 on its outer or free end. This switch arm is cantilevered within the housing and is movable between a run position (as shown in FIGS. 2 and 4) and a starting position (as shown in FIG. 3) for making and breaking contact with terminals 27 and 29 (that is for making and breaking contact between contacts 37 and 39) so as to constitute a single pole, double throw switch. Terminal 31 (the third output terminal) has a respective contact 45 thereon disposed within housing 21. Switch arm 41 is resiliently biased toward engagement with contact 39.

Switch 1 further has a plunger 47 movable along a path (as indicated by the arrows in FIGS. 2-4) within housing 21 movable in response to movement of centrifugal actuator 13 for movement between its starting and run positions. As shown in FIGS. 2-5, plunger 47 extends out beyond one face of housing 21 for actuation by linkage 15. Plunger 47 has a second cantilevered switch arm 49 secured to and flexibly movable within the housing. Switch arm 49 carries a contact 51 on its free end for making and breaking contact with stationary contact 45 on terminal 31. As indicated at 53 in FIGS. 2, 3, and 5, an electrically conductive compression coil spring preferably of a good electrical spring material, such as beryllium copper or the like, is interposed between plunger 49 and switch arm 41 so as to electrically connect switch arms 41 and 49 and so as to cause switch arm 41 to follow movement of the plunger. As indicated at 55 in FIG. 4, another embodiment of switch 1 of this invention utilizes a link or strip of relatively stiff, electrically conductive metal, such as beryllium copper, carried by plunger 49 to electrically connect switch arms 41 and 49 and to force switch arm 41 to follow movement of the plunger. This strip extends substantially parallel to the direction of movement of plunger 47 within housing 21 and the upper end of the strip is bent back on itself in hook-shaped fashion with the curved free end of the strip bearing against and being in good electrical contact with switch arm 41 intermediate the ends of the switch arm. Both spring 53 and strip 55 are in electrical contact with switch arm 41 at least when the switch is in its starting position and preferably at all times.

As can be most easily seen by referring to FIGS. 2-4, with switch 1 of this invention in its starting position, plunger 47 is forced inwardly into housing 21 and switch arm 41 is forced from its normal biased position in which contact 43 bears against contact 39 so as to make electrical contact between contacts 43 and 37 by means either of spring 53 (as shown in FIGS. 2 and 3) or via strip 55 as shown in the embodiment of FIG. 4. Also, inward movement of plunger 47 causes contact 51 on switch arm 49 to make electrical contact with stationary contact 45. Upon movement of centrifugal actuator 13 (and hence plunger 47) from its start to its run position, the plunger is permitted to move outwardly of the housing under the bias of spring arm 41 returning to its normal position (i.e., toward its run position). Thus, as switch arm 41 is permitted to return to its normally biased position, it breaks contact between contacts 37 and 43 and makes electrical contact between contacts 43 and 39. Also, outward movement of the plunger breaks contact between contacts 45 and 51.

With either embodiment of switch 1 wired into a two speed motor circuit, such as is shown in FIGS. 2-4, with speed selector switch 33 set for low speed operation of the motor, and with the starting switch in its start position, current from load lines L1 and L2 will be supplied to terminals 23 and 25 upon energization of the motor. This current flows from terminal 23 through switch arm 41 to terminal 27 via closed contacts 37 and 43 and then through high speed winding 16 to terminal 25 of the switch thus completing a circuit. Current also flows from switch arm 41 through spring 53 (see FIGS. 2, 3, and 5) or through strip 55 (see FIG. 4) to switch arm 49 and into terminal 31 via contacts 45 and 51. In turn, electrical power is supplied from terminal 31 to auxiliary winding 19 and then to terminal 25 completing a circuit. If speed selector switch 33 were alternatively set for high speed operation of motor 3, current would be supplied directly to terminal 27 rather than to terminal 23, as above described when the speed selector switch is in its low speed position. With power being supplied to terminal 27 and with switch 1 in its start position, current flows from terminal 27 to high speed winding 16 and to switch arm 41 via closed contacts 37 and 43 and thence to terminal 31 via spring 53 (or strip 55), switch arm 49, and closed contacts 51 and 45. This in turn permits energization of both high speed winding 16 and auxiliary winding 19 for startup.

It will also be noted that switch 1 of this invention requires substantially less force for actuation than a comparable prior art starting switch, such as the prior art switch indicated at reference character 101 and as shown in FIG. 1. As will be apparent, switch 101 includes two cantilevered spring switch arms 103 and 105 which are normally biased toward their respective run positions opposite from what is shown in FIG. 1. A solid plunger member 107 is moved inwardly of housing 21 by means of linkage 15 so as to effect resilient bending of switch arms 103 and 105 from their run positions (not shown) to their starting positions (as shown in FIG. 1). A return spring 109 is typically provided within the housing so as to bias the plunger toward its run position. It will be particularly noted that a total of six terminals is required for the prior art switch and a jumper 111 is needed to interconnect two of the terminals of the prior art switch so as to effect energization of the auxiliary winding 19 when speed selector switch is set for low speed operation. This jumper has in the past presented problems and adds to the cost of the switch. Also, as this prior art switch moved from its starting to its run position, power to the low speed winding would be momentarily broken thereby causing arcing within the switch.

It is a particular feature of switch 1 of the present invention that it requires considerably less force for actuation than with prior art switches, such as shown in FIG. 1, that it requires fewer terminals (five as opposed to six) and further that no jumper is required to connect the auxiliary winding 19 of the motor to a source of electrical power when the speed selector switch is regardless of position of the speed selector switch 33.

In view of the above, it will be seen that the several objects and features of this invention are achieved and other advantageous results attained.

As various changes could be made in the above construction without departing from the scope of the invention, it is intended that all matter contained in the above description or shown in the accompanying drawings shall be interpreted as illustrated and not in a limiting sense.

We claim:

1. A motor starting switch for use with a two speed electric motor having a first set of windings energizable for low speed operation, a second set of windings energizable for high speed operation, a starting winding energizable during start up of the motor, and a speed selector switch for selecting high or low speed operation of said motor, said starting switch being actuable by a centrifugal actuator included within said motor responsive to the speed of the motor for switching said starting switch from a starting position in which said high speed winding and said starting winding are energized and a run position in which starting winding is deenergized and in which either the high or low speed winding is energized as may have been previously selected by the setting of said speed selector switch, said starting switch comprising a housing, a plurality of power input terminals adapted to be connected to a source of electric power, the first of said power input terminals being adapted to be energized by said speed selector switch when the latter is in its low speed position, another of said input terminals being adapted to be energized by said speed selector switch when the latter is in its high speed position, and another of said power input terminals being adapted to be connected to said windings and to said source of power, said switch further having a plurality of output terminals, a first of which is adapted to be connected to said high speed winding, said first output terminal being energized by the high speed side of said speed selector switch, a second of which is adapted to be connected to said low speed winding, and a third of which is adapted to be connected to said starting winding, said first and second output terminals each having a respective contact disposed within said housing and being spaced apart from one another, a first movable switch arm within the housing being connected to said one input terminal, said first and second contacts and said first switch arm constituting a double throw single pole switch, said starting switch further having a plunger movable along a path within said housing in response to movement of said centrifugal actuator between its starting and run positions, said third output terminal having a third contact disposed within said housing, said starting switch still further comprising a second switch arm carried by said plunger engageable with said third contact, means carried by said plunger for making electrical contact between said first and second switch arms and for effecting movement of said first switch arm with said plunger as the latter moves between its starting and run positions in response to movement of the centrifugal actuator, said first switch arm being engageable with said first contact and said second switch arm being engageable with said third contact when said plunger is in its starting position thereby to provide energization of said high speed winding regardless of the speed selected by said speed selector switch and to provide energization of said starting winding via said first switch arm and said means carried by said plunger, said first switch arm being movable from engagement with said first contact to engagement with said second contact and said second switch arm being movable clear of said third contact upon movement of said plunger from its starting to its run position thereby to deenergize said starting winding and to permit energization of the selected high or low speed winding of the motor for continued operation of the motor in its selected speed mode.

2. A motor starting switch as set forth in claim 1 wherein said means carried by the plunger for making electrical contact with said first switch arm and for effecting movement of said first switch arm comprises a coil spring of electrically conductive material interposed between said plunger and said first switch arm, said spring being in electrical contact with said first and second switch arms and substantially taking up excess movement of said plunger after said first switch arm makes contact with said first contact on said first terminal thereby to prevent application of excessive bending stresses on the first switch arm as the plunger moves fully to its starting position.

3. A motor starting switch as set forth in claim 1 wherein said means carried by the plunger for making electrical contact with said first arm and for effecting movement of said first switch arm comprises a link of relatively stiff, electrically conductive sheet metal or the like extending substantially parallel to the direction of movement of said plunger within said housing, the end of said link engaging said first switch arm intermediate its ends, said link being in electrical contact with both of said switch arms when said plunger is in its starting position.

4. A motor starting switch as set forth in claim 3 wherein the end of said link engageable with said switch arm is at least partially bent back on itself.

5. A motor starting switch as set forth in claim 1 wherein said means carried by said plunger for making electrical contact with the first switch arm and for effecting movement of said first switch arm is a resilient member adapted to compress and to take up additional movement of said plunger after said plunger has effected movement of the first switch arm into engagement with said first contact as said plunger moves fully to its run position.

* * * * *